(12) United States Patent
Gritti

(10) Patent No.: US 9,621,029 B2
(45) Date of Patent: Apr. 11, 2017

(54) METHOD AND DEVICE FOR HIGH-POWER-FACTOR FLYBACK CONVERTER

(71) Applicant: STMICROELECTRONICS S.R.L., Agrate Brianza (IT)

(72) Inventor: Giovanni Gritti, Bergamo (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 8 days.

(21) Appl. No.: 14/661,968

(22) Filed: Mar. 18, 2015

(65) Prior Publication Data

US 2016/0276936 A1 Sep. 22, 2016

(51) Int. Cl.
*H02M 3/335* (2006.01)
*H02M 1/42* (2007.01)
*H02M 1/00* (2006.01)

(52) U.S. Cl.
CPC .. *H02M 1/4258* (2013.01); *H02M 2001/0009* (2013.01); *Y02B 70/126* (2013.01)

(58) Field of Classification Search
CPC ............. H02M 3/335; H02M 3/33507; H02M 3/33515; H02M 3/33523; H02M 1/0032; H02M 1/42; H02M 2001/0009; A01B 12/006
USPC ......... 363/21.12–21.18, 48, 78, 89; 323/222, 323/282, 285, 299
See application file for complete search history.

(56) References Cited

U.S. PATENT DOCUMENTS

| | | | |
|---|---|---|---|
| 5,729,443 A | 3/1998 | Pavlin | |
| 6,181,120 B1* | 1/2001 | Hawkes | H02M 3/156 323/282 |
| 6,356,466 B1 | 3/2002 | Smidt et al. | |
| 6,853,563 B1 | 2/2005 | Yang et al. | |
| 6,944,034 B1* | 9/2005 | Shteynberg | H02M 1/4258 323/282 |
| 7,425,857 B2 | 9/2008 | Confalonieri et al. | |
| 8,467,209 B2* | 6/2013 | Adragna | H02M 1/4225 323/222 |
| 8,520,416 B2 | 8/2013 | Xie et al. | |
| 8,686,668 B2 | 4/2014 | Grotkowski et al. | |

(Continued)

FOREIGN PATENT DOCUMENTS

EP 2 753 148 B1 9/2015

OTHER PUBLICATIONS

Adragna, C., "Design Equations of High-Power-Factor Flyback Converters Based on the L6561," AN 1059 (Application Note), STMicroelectronics, pp. 1-20, Sep. 2003.

(Continued)

*Primary Examiner* — Yemane Mehari
(74) *Attorney, Agent, or Firm* — Seed IP Law Group LLP

(57) ABSTRACT

The present disclosure is directed to a switching power converter having a power transistor controlled by a controller. The controller includes a multiplier that produces a voltage reference signal. A subtraction circuit subtracts a capacitor signal, which is based on the voltage reference signal, from a sensing signal that is representative of the current flowing through the power transistor. A comparator compares the voltage reference signal to the output of the subtraction circuit, and a driving circuit drives the power transistor based on the comparison resulting in a high power factor and low total harmonic distortion for the converter.

25 Claims, 10 Drawing Sheets

(56) References Cited

U.S. PATENT DOCUMENTS

| | | |
|---|---|---|
| 2012/0026765 A1 | 2/2012 | Adragna |
| 2012/0281438 A1 | 11/2012 | Fang et al. |
| 2013/0070485 A1 | 3/2013 | Li et al. |
| 2013/0088897 A1 | 4/2013 | Adragna |
| 2013/0114308 A1 | 5/2013 | Liao et al. |
| 2013/0154487 A1 | 6/2013 | Kuang et al. |
| 2016/0172981 A1 | 6/2016 | Gritti et al. |

OTHER PUBLICATIONS

Adragna, C., "Primary-Controlled High-PF Flyback Converters Deliver Constant Dc Output Current," Proceedings of the 2011—14$^{th}$ European Conference on Power Electronics and Applications (EPE 2011), Aug. 30-Sep. 1, 2011, pp. 1-10.

Erikson, R. et al., "Design of a Simple High-Power-Factor Rectifier based on the Flyback Converter", Applied Power Electronics Conference and Exposition, 1990. APEC '90, Conference Proceedings 1990, pp. 792-801, Mar. 1990.

Adragna et al., "Flyback Converters with the L6561 PFC Controller," AN1060 (Application Note), STMicroelectronics, pp. 1-11, Jan. 2003.

Wang et al., "An Improved Control Strategy Based on Multiplier for CRM Flyback PFC to Reduce Line Current Peak Distortion," IEEE Energy Conversion Congress and Exposition (ECCE), Sep. 12-16, 2010, pp. 901-905.

Yan et al., "Variable-On-Time-Controlled Critical-Conduction-Mode Flyback PFC Converter," *IEEE Transactions on Industrial Electronics* 61(11):6091-6099, Nov. 2014.

Zhang et al., "An Optimal Peak Current Mode Control Scheme for Critical Conduction Mode (CRM) Buck PFC Converter," 10th China International Forum on Solid State Lighting (ChinaSSL), Nov. 10-12, 2013, pp. 182-189.

\* cited by examiner

METHOD AND DEVICE FOR HIGH-POWER-FACTOR FLYBACK CONVERTER

BACKGROUND

Technical Field

The present disclosure relates to converters and, more particularly, to a control device for a quasi-resonant high-power-factor AC/DC converter.

Description of the Related Art

High-Power-Factor (Hi-PF) Quasi-resonant (QR) flyback converters are a common choice in a number of cost-sensitive applications, such as solid-state lighting (SSL). Power converters are often powered from the ac power line, and many applications should also meet both the IEC60950 regulation on electrical safety and the IEC61000-3-2 regulation on the limits for harmonic current emissions. In fact, they are able to generate a bus voltage isolated from the power line to meet IEC60950, and draw a current with low harmonic content to meet IEC61000-3-2 with a single conversion stage.

A considerable number of Power Factor Control (PFC) control chips implementing QR operation (e.g. Transition Mode, Boundary Mode or Critical Mode) are commercially available. Although primarily conceived for controlling PFC converters using boost topology, they can be successfully used to control Hi-PF QR flyback converters as well.

A Hi-PF flyback converter is powered from the ac power line with no energy reservoir capacitor after the input bridge rectifier, thus its input voltage is basically a rectified sinusoid ($V_{in}(\theta)=V_{PK}|\sin\theta|$) and the current drawn from the power line is sinusoidal-like.

A flyback converter (whether Hi-PF or not) is said to be QR-operated when the turn-on of the power switch, often a MOSFET, is synchronized to the instant the transformer demagnetizes, when the secondary current has become zero, normally after an appropriate delay. This allows the turn-on to occur on the valley of the drain voltage ringing that follows the demagnetization, therefore reducing turn-on losses. For this reason this operation is often termed "valley-switching". Most commonly, peak current mode control is used, so the turn-off of the power switch is determined by the current sense signal reaching the value programmed by the control loop that regulates the output voltage or current.

FIG. 1 shows a Hi-PF QR flyback converter 20 according to the prior art. On the primary side, the flyback converter 20 comprises a bridge rectifier 22 having the ac power line at its input 24. A capacitor $C_{in}$, which serves as a high-frequency smoothing filter, is connected across the output terminals of the bridge rectifier 22, with the negative terminal connected to ground and the positive terminal connected to a primary winding $L_p$ of a transformer 26. The transformer 26 also has an auxiliary winding $L_{aux}$, and a secondary winding $L_s$. A power switch M has its drain terminal tied to the primary winding $L_p$, and its source terminal connected to ground via a resistor Rs. The resistor Rs allows a reading of the current flowing through the power switch M, which is representative of the current flowing through $L_p$ when M is ON. The primary side of the converter also includes a resistive voltage divider, made up of resistors $R_a$ and $R_b$ connected in parallel with the capacitor $C_{in}$, and a clamp circuit 27 that clamps the spikes on the drain voltage due to the leakage inductance of the primary winding $L_p$.

On the secondary side of the transformer 26, the secondary winding $L_s$ has one end connected to the secondary ground and the other end connected to the anode of a diode D. The diode D has its cathode connected to the positive plate of a capacitor $C_{out}$ that has its negative plate connected to the secondary ground.

This flyback converter 20 generates at its output terminals across $C_{out}$ a dc voltage $V_{out}$ that will supply the load. Assuming an SSL application, the load will be a string of high-brightness LEDs.

The converter is closed-loop controlled isolated converter in which the quantity to be regulated (either the output voltage $V_{out}$ or the output current $I_{out}$) is compared to a reference value and an error signal is generated depending on the difference between the regulated quantity and the reference value. This error signal is transferred to the primary side, typically with an optocoupler, which is not shown in FIG. 1. On the primary side, this error signal is represented by a current $I_{FB}$ that is sunk from a dedicated pin FB in a controller 29, producing a control voltage $V_c$ on the pin FB. The controller 29 drives the power switch M based in part on the control voltage $V_c$. The control voltage $V_c$ can be regarded as a dc level if the open-loop bandwidth of the overall control loop, which is determined by a frequency compensation network located inside an isolated feedback block 28, is narrow enough, typically below 20 Hz, and a steady-state operation is assumed.

The control voltage $V_c$ is internally fed into one input of a multiplier block 30. The multiplier 30 also receives a portion of the instantaneous rectified line voltage sensed across $C_{in}$, which is divided at a resistor divider Ra–Rb. The divider ratio Rb/(Ra+Rb) will be denoted with $K_p$.

The output of the multiplier block 30 is the product of a rectified sinusoid times a dc level, then still a rectified sinusoid whose amplitude depends on the rms line voltage and the amplitude of the control voltage $V_c$. The multiplier 30 output signal will be a voltage reference signal $V_{CS,REF}(\theta)$ for the peak primary current.

The output signal of the multiplier 30 is fed to the inverting input of a comparator 32 that receives at its non-inverting input the sensing signal $V_{CS}(t,\theta)$ that is sensed across the sense resistor Rs. The sensing signal $V_{CS}(t, \theta)$ is proportional to the instantaneous current $I_p(t,\theta)$ flowing through the primary winding $L_p$ and the power switch M when the power switch M is ON. Assuming the power switch M is initially ON, the current through the primary winding $L_p$ will be ramping up and so will the voltage across the resistor Rs. A SR flip-flop 34 has an output Q that is coupled to a driver 35, which drives the power switch M. When $V_{CS}(t,\theta)$ equals $V_{CS,REF}(\theta)$ the comparator 32 resets the SR flip-flop 34, and the power switch M is switched off. Therefore, the reference voltage signal $V_{CS, REF}(\theta)$ from the multiplier 30, which is shaped as a rectified sinusoid, determines the peak value of the primary current, which will be enveloped by a rectified sinusoid.

After the power switch M has been switched off, the energy stored in the primary winding $L_p$ is transferred by magnetic coupling to the secondary winding $L_s$ and then dumped into the output capacitor $C_{out}$ and the load until the secondary winding $L_s$ is completely demagnetized. At this point, the diode D opens and the drain node, which was fixed at $V_{in}(\theta)+V_R$ while $L_s$ and D were conducting, becomes floating. The drain node's voltage tends to eventually reach the instantaneous line voltage $V_{in}(\theta)$ through a damped ringing due to its parasitic capacitance that starts resonating with $L_p$. However, the quick drain voltage fall that follows the transformer 26 demagnetizing is coupled to the pin ZCD of the controller through the auxiliary winding $L_{aux}$ and the resistor $R_{ZCD}$. A zero-crossing detector (ZCD) 36 releases a pulse every time it detects a negative-going edge falling below a threshold, and this pulse sets the SR flip-flop 34 and drives the ON the power switch M, starting a new switching cycle.

An OR gate 38 between the ZCD 36 and the set input of the SR flip-flop 34 allows the output of a STARTER block 40 to initiate a switching cycle. The starter block 40 produces a signal at power-on when no signal is available on the input pin ZCD and prevents the converter 20 from getting stuck in case the signal on the input pin ZCD is lost for any reason.

Assuming $\theta \in (0, \pi)$, according to the control scheme under consideration the peak envelope of the primary current is given by:

$$I_{pkp}(\theta) = I_p(T_{ON}, \theta) = I_{PKp} \sin \theta. \quad (1)$$

It is worth noticing that this scheme results in a constant ON-time $T_{ON}$ of the power switch M:

$$T_{ON} = L_p \frac{I_{PKp} \sin\theta}{V_{PK} \sin\theta} = L_p \frac{I_{PKp}}{V_{PK}}, \quad (2)$$

For simplicity, the OFF-time of the power switch, $T_{OFF}(\theta)$, will be considered coincident with the time $T_{FW}(\theta)$ during which current circulates on the secondary side. In other words, the time interval $T_R$ during which the voltage across the primary switch rings until reaching the valley of the ringing will be neglected. This is acceptable as long as $T_R \ll T_{OFF}(\theta)$.

The switching period $T(\theta)$ is therefore given by:

$$T(\theta) = T_{ON} + T_{FW}(\theta). \quad (3)$$

Considering volt-second balance across the primary inductor it is possible to write:

$$T_{FW}(\theta) = T_{ON} \frac{V_{PK} \sin\theta}{V_R}. \quad (4)$$

where $V_R$ is the reflected voltage, i.e. the output voltage $V_{out}$ times the primary-to-secondary turns ratio $n = N_p/N_s$, seen across the primary winding $L_p$ of the transformer 26 in the time interval $T_{FW}(\theta)$:

$$V_R = n(V_{out} + V_F) \quad (5)$$

wherein $V_F$ is the forward drop on the secondary rectifier. Therefore, $T(\theta)$ can be rewritten as:

$$T(\theta) = T_{ON}(1 + K_v \sin \theta). \quad (6)$$

with $K_v = V_{PK}/V_R$.

The input current $I_{in}(\theta)$ to the converter is found by averaging the primary current $I_p(t, \theta)$ over a switching cycle. The primary current $I_p(t, \theta)$ is the series of gray triangles in the right-hand side diagram of FIG. 2 so, taking equation (1) into account, it is found that:

$$I_{in}(\theta) = \frac{1}{2} I_{pkp}(\theta) \frac{T_{ON}}{T(\theta)} = \frac{1}{2} I_{PKp} \frac{\sin\theta}{1 + K_v \sin\theta}. \quad (7)$$

Equation (7) shows that the input current is not a pure sinusoid. The function $\sin \theta/(1+K_v \sin \theta)$, plotted in FIG. 3a for different values of $K_v$, is a periodic even function, at twice the line frequency. Conversely, the current drawn from the mains will be its "odd counterpart", at the line frequency, as shown in FIG. 3b.

This current is sinusoidal only for $K_v = 0$. When $K_v \neq 0$, although a sinusoidal-like shape is maintained, the input current is distorted, the higher $K_v$ the higher the distortion. Since $K_v$ cannot be zero (which would require the reflected voltage to tend to infinity), the obvious conclusion is that this QR control scheme does not permit zero Total Harmonic Distortion (THD) of the input current nor unity power factor in a flyback converter even in the ideal case, unlike boost topology.

FIG. 4 shows the plots of the THD of the input current and of the Power Factor vs. $K_v$.

Although the distortion is significant, especially at high line (i.e. high $K_v$) the individual harmonics are still well within the limits considered by the regulation on the limits for harmonic current emissions, the IEC61000-3-2 (or its Japanese homologous, the JEIDA-MITI). An example of harmonic measurements on a real-world application is shown in FIG. 5. For this reason the Hi-PF QR flyback converter is currently widely used, especially in solid state lighting (SSL) applications where safety isolation from the power line is required by regulations. These include LED drivers from a few watts to tens of watts for residential and professional lighting.

Still considering the SSL market, this inherent distortion is a significant problem. In fact, as shown in the plot of FIG. 4, it is difficult to meet the target THD<10% (or even lower) that is becoming a market requirement in some geographical areas. Low values of Kv should be used even at high line, which means a high reflected voltage $V_R$. Because the power MOSFET in a flyback converter has to be rated for a breakdown voltage significantly larger than $V_{PKmax} + V_R$, in principle a high $V_R$ requires a high voltage rating MOSFET, which is more expensive and has higher parasitic losses. In practice, to meet the target, $V_R$ might be so high that a MOSFET with adequate voltage rating could be prohibitive in terms of cost or originate too much power loss, or even be unavailable.

In the literature it is reported that a Hi-PF flyback converter operated in Discontinuous Conduction Mode (DCM) with a fixed switching frequency has no inherent distortion of the input current. Specifically, it is demonstrated that, operating in that way, the shape of the input current tracks that of the input voltage provided the quantity $D^2T$, where D is the duty cycle of the power switch and T the switching period, is constant along each line half-cycle under steady-state conditions. With a fixed switching period T, keeping the duty cycle D constant along a line half-cycle meets the control goal.

By definition, this provides unity power factor and, with a sinusoidal input voltage, a sinusoidal input current. This approach is used in commercial products.

However, there are a few benefits in using QR operation that are lost when operating in DCM with a fixed frequency (FF).

First, QR operation results in lower conducted electromagnetic interference (EMI) emissions. Due to the sinusoidal input voltage, the switching frequency is modulated at twice the line frequency $f_L$. This causes the spectrum to be spread over frequency bands, rather than being concentrated on single frequency values. Especially when measuring conducted emissions with the average detection method, the level reduction can be of several dBµV. It is then possible to reduce the size and the cost of the EMI filter.

Second, QR operation gives safer operation under short circuit conditions. The conduction cycles of the power switch (MOSFET) start only when the transformer is fully demagnetized, so flux runaway and, therefore, transformer saturation are not possible. Moreover, during a short circuit the demagnetization voltage is very low, so the time needed for the transformer to demagnetize becomes very long and the converter works at low frequency with a small duty cycle. As a result, the power that the converter is able to carry is very low.

Finally, QR operation results in higher efficiency. With QR operation the converter works very close to the DCM-CCM (Continuous Conduction Mode) boundary. The form factor (i.e. the ratio of the rms to the dc value) of both the primary and the secondary currents is generally smaller with respect to FF operation where the converter can work deep in DCM. Consequently, for a given throughput, power conduction losses are lower with QR. Additionally, QR allows valley-switching or even true soft-switching (zero-voltage switching, ZVS, when $V_{PK} < V_R$), which minimizes turn-on losses in the power switch (MOSFET).

BRIEF SUMMARY

One embodiment of the present disclosure is directed a power converter having a controller for controlling a power transistor. The controller has a driver circuit that receives a voltage reference signal and a subtraction signal, and outputs a signal to drive the power transistor based on the voltage reference signal and subtraction signal. A multiplier that receives a first signal based on a feedback signal from the power circuit, and a second signal based on an input voltage to the power circuit, outputs the voltage reference signal. A subtraction circuit provides the subtraction signal based on the reference voltage signal and a sensing signal representative of a current flowing through the power switch. The subtraction circuit includes a current generator coupled to the multiplier and configured to produce a capacitor signal based on the voltage reference signal, and a subtractor configured to subtract the capacitor signal from the sensing signal and to produce the subtraction signal.

According to a further embodiment, the subtraction circuit also includes a first switch configured to couple the current generator to a voltage supply terminal when the power switch is on, a second switch configured to couple the current generator to the subtractor when the power switch is off, and a third switch configured to couple the subtractor to the voltage supply terminal when the power switch is on. According to yet a further embodiment, the subtraction circuit also includes a capacitor coupled between the subtractor and the supply voltage terminal, wherein the second switch is configured to connect the current generator to the capacitor. In accordance with still a further embodiment, the subtraction circuit includes a resistor coupled between the subtractor and the third switch, wherein the resistor discharges the capacitor when the third switch is closed.

According to one embodiment, the driver circuit includes a comparator having a first input coupled to the multiplier and a second input coupled to the subtractor, the comparator being configured to compare the voltage reference signal to the subtraction signal. In accordance with a further embodiment, the driving circuit turns off the power transistor when the subtraction signal is equal to the voltage reference signal. And in accordance with yet a further embodiment, the driver circuit includes a flip-flop having a reset input coupled to the output of the comparator, and an output, and a driver having an input coupled to the output of the flip-flop and an output configured to control the power switch.

DETAILED DESCRIPTION

This disclosure presents a control method that enables high power factor (Hi-PF) quasi resonant (QR) flyback converters with peak current mode control to draw a sinusoidal current from the input source, which means no harmonic distortion of the input current, thus performing like boost converters operated in the same way.

Figure 2:
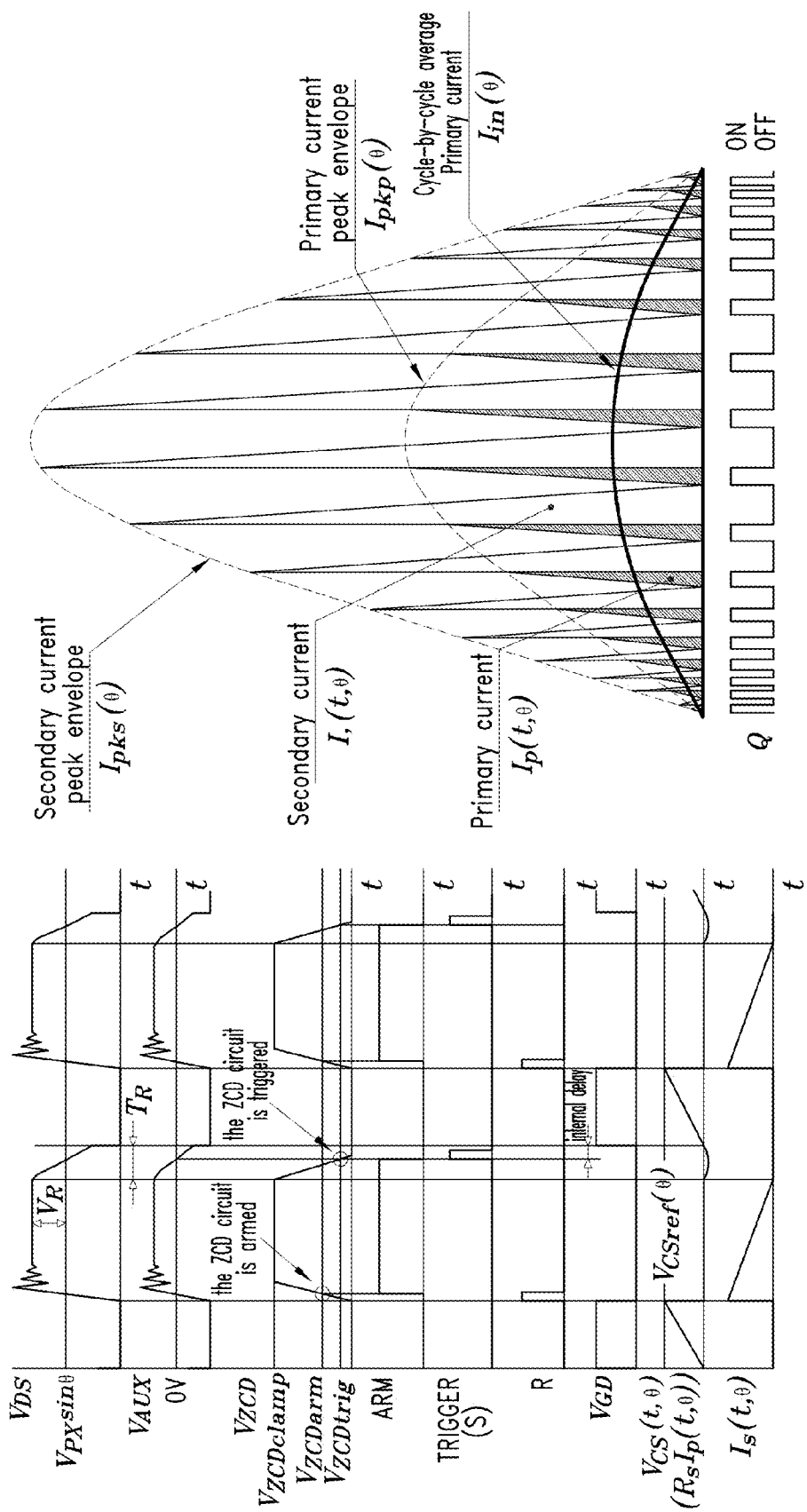
FIG. 2 illustrates the waveforms of the converter in FIG. 1 during normal operation; on the left-hand side the waveforms on a switching period time scale, on the right-hand side the waveforms on a line cycle time scale.
Figure 3B:
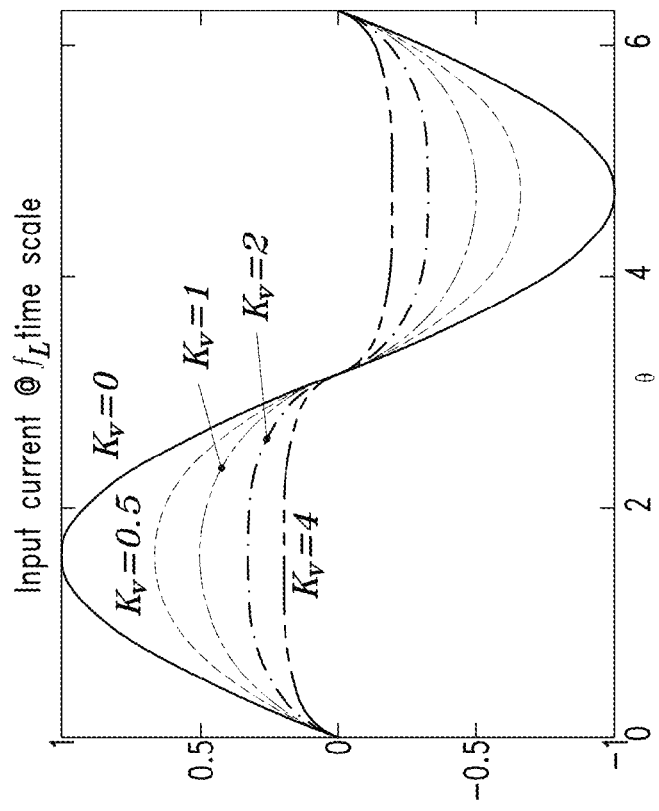
FIG. 3b shows the plot of the function $\sin \theta/(1+Kv|\sin \theta|)$ in the interval $\theta \in (0, 2\pi)$ for different values of Kv, showing the shape of the input current in the circuit of FIG. 1.
Figure 3A:
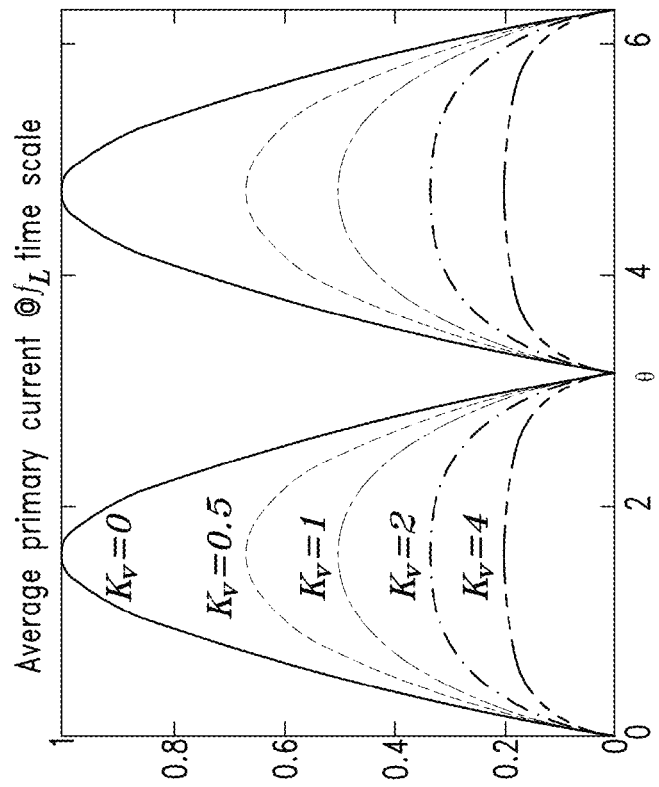
FIG. 3a shows the plot of the function $|\sin \theta|/(1+Kv|\sin \theta|)$ in the interval $\theta \in (0, 2\pi)$ for different values of Kv, showing the shape of the average primary current in the circuit of FIG. 1.
Figure 4:
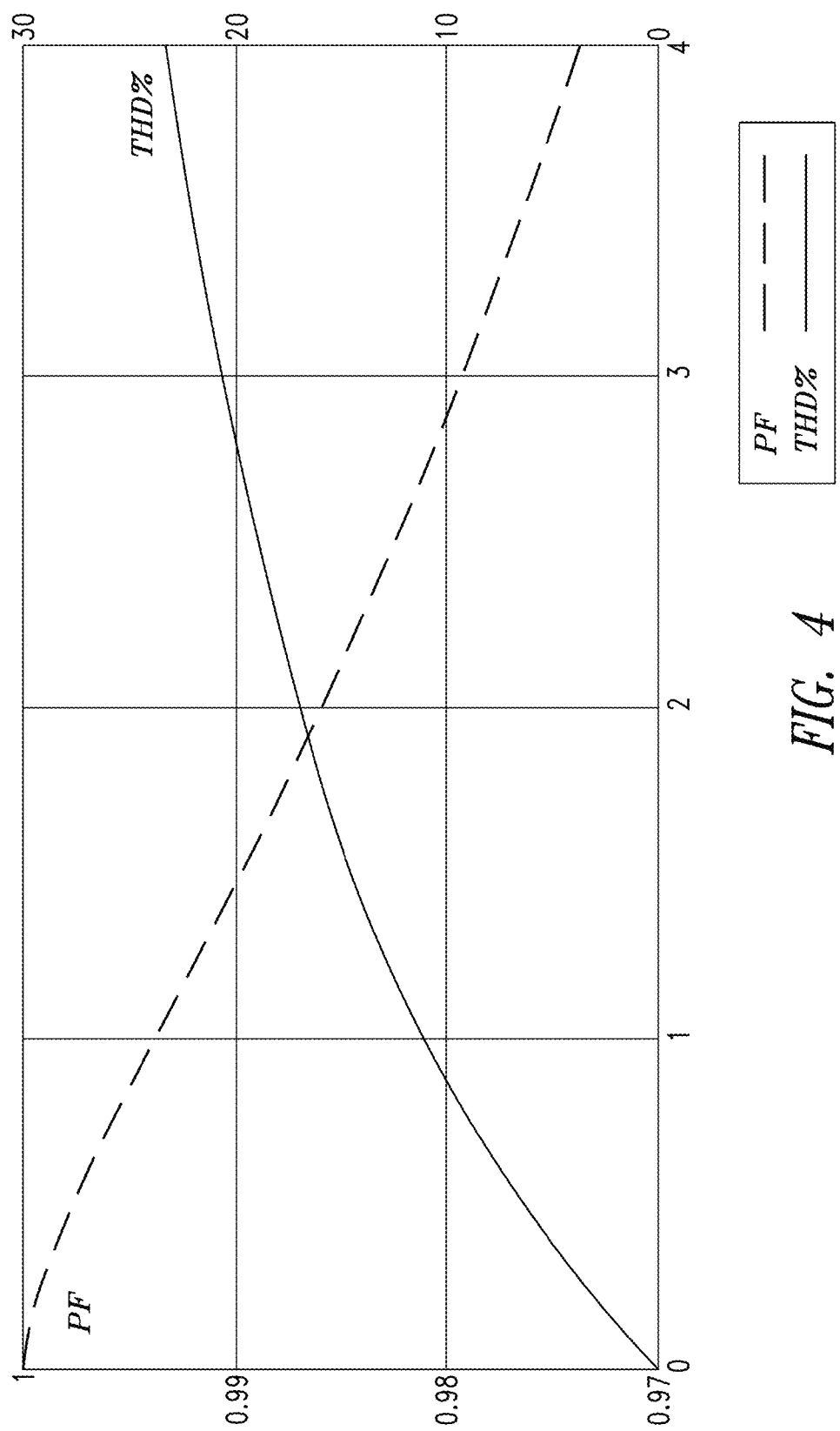
FIG. 4 shows the plot of the Total Harmonic Distortion of the input current and the Power Factor obtained with the circuit of FIG. 1 for different values of Kv.
Figure 5:
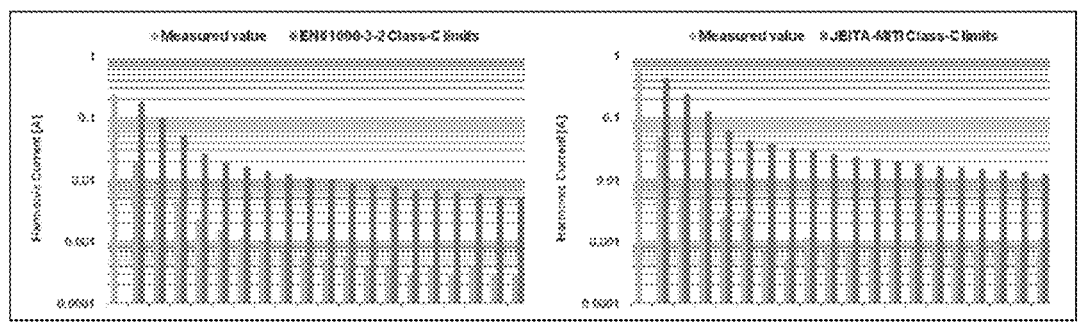
FIG. 5 shows typical harmonic test results in a high power factor quasi resonant flyback converter of the FIG. 1
Figure 6:
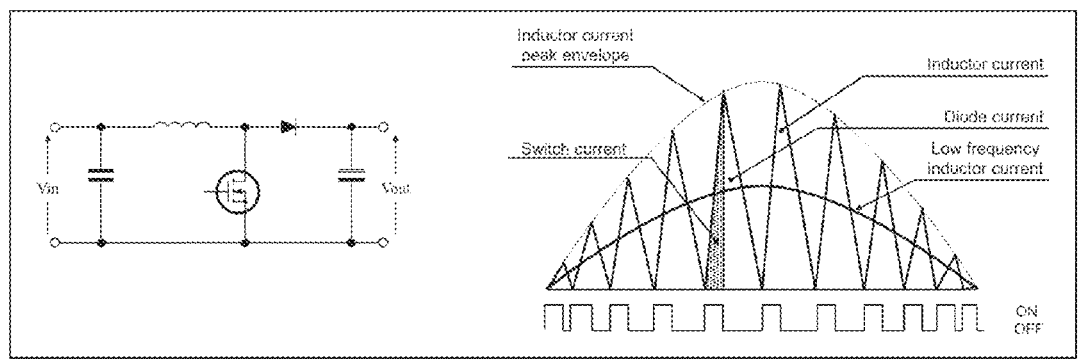
FIG. 6 shows a boost converter and the current waveforms on a line cycle time scale.

One idea of the present disclosure stems from observing the waveforms shown on the right-hand side of FIG. 2 and comparing them to those of a boost converter, such as the one shown in FIG. 6. In the boost converter, the input current is the average of the inductor current, which flows both during the ON-time and the OFF-time of the power switch. As a result, being a series of contiguous triangles, the average value is half the peak. Also, given that the envelope of the peaks is sinusoidal, the input current will be sinusoidal.

Figure 1:
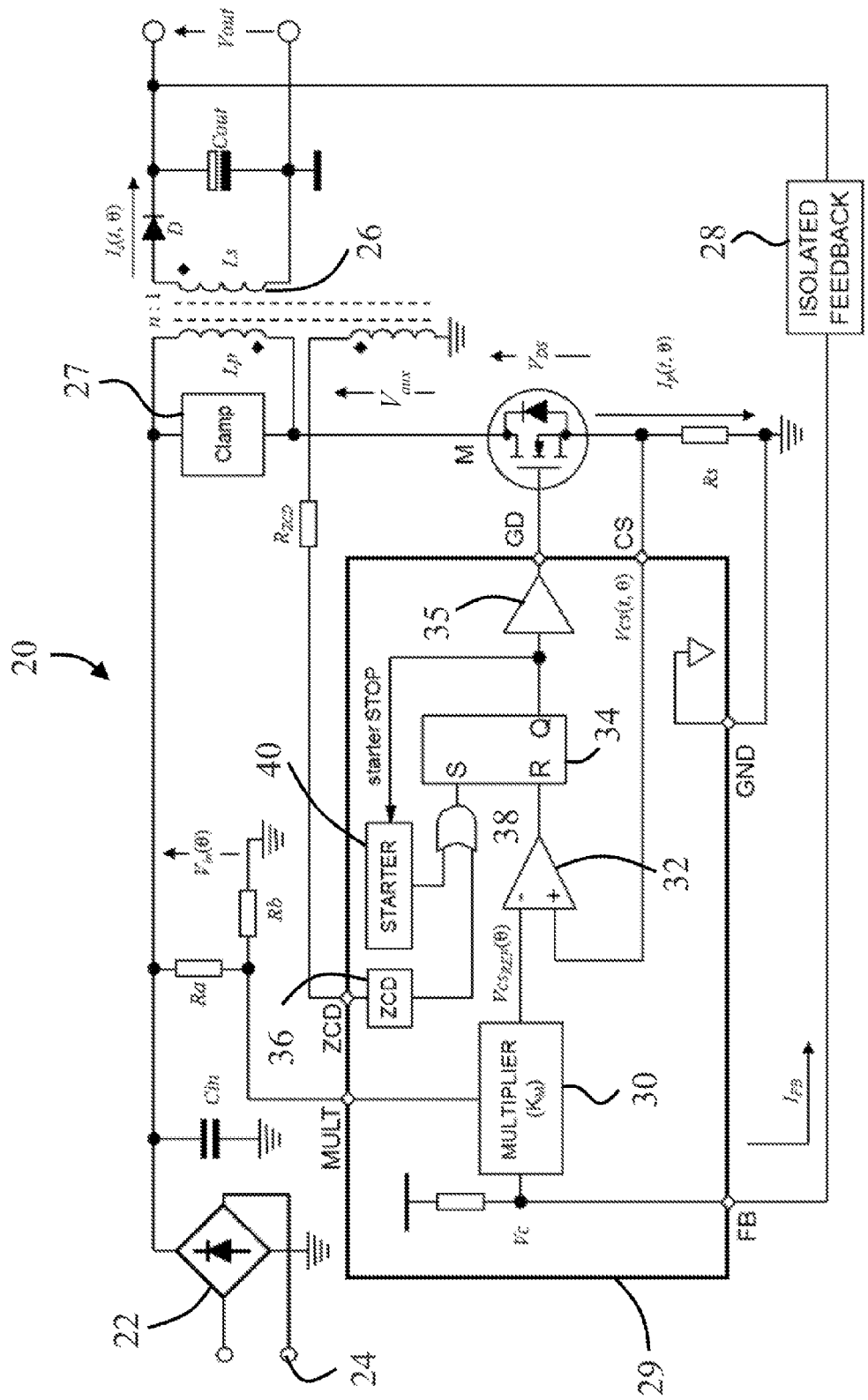
FIG. 1 shows a high power-factor quasi resonant flyback converter along with the relevant control IC according to the prior art.

In contrast, in the prior art flyback converter 20 of FIG. 1, the input current is the average of the primary current, which flows only during the ON-time of the power switch and is a series of triangles separated by voids corresponding to the OFF-time of the power switch, as shown in FIG. 2. This "chopping" causes the average value of the primary current to be lower than half the peak value and to depend on the mark-space ratio of the triangles. As a result, the input current is no longer proportional to the envelope of the peaks and, unlike the envelope that is sinusoidal, the input current will not be sinusoidal.

To express this quantitatively, it is worth re-examining equation (7) considering that $$I_{pkp}(\theta) = \frac{V_{CS}(\theta)}{R_S};$$

$$I_{in}(\theta) = \frac{1}{2} I_{pkp}(\theta) \frac{T_{ON}}{T(\theta)} = \frac{1}{2} \frac{V_{CS}(\theta)}{R_S} \frac{T_{ON}}{T(\theta)}.$$

The term $I_{pkp}(\theta)$, which represents the peak envelope of the primary current, is sinusoidal so the distortion is originated by the term $T_{ON}/T(\theta)$, introduced by the primary current being chopped, which is not constant ($T_{ON}$ is constant but $T(\theta)$ is not).

The inventors have discovered that if the current sense signal $V_{CS}(\theta)$, that determines $I_{pkp}(\theta)$, is opportunely distorted with a term also proportional $T(\theta)/T_{ON}$, this will cancel out the term $T_{ON}/T(\theta)$ introduced by averaging and result in a sinusoidal average primary current, i.e. in a sinusoidal input current. Then, the control objective can be expressed in the following terms:

$$V_{CS}(\theta) = V_{CS_x} \sin\theta \frac{T(\theta)}{T_{ON}(\theta)}. \tag{8}$$

wherein $T_{ON}$ is denoted as a function of the instantaneous line phase $\theta$. In fact, with a method different from that of the prior art it is not necessarily constant.

Figure 7:
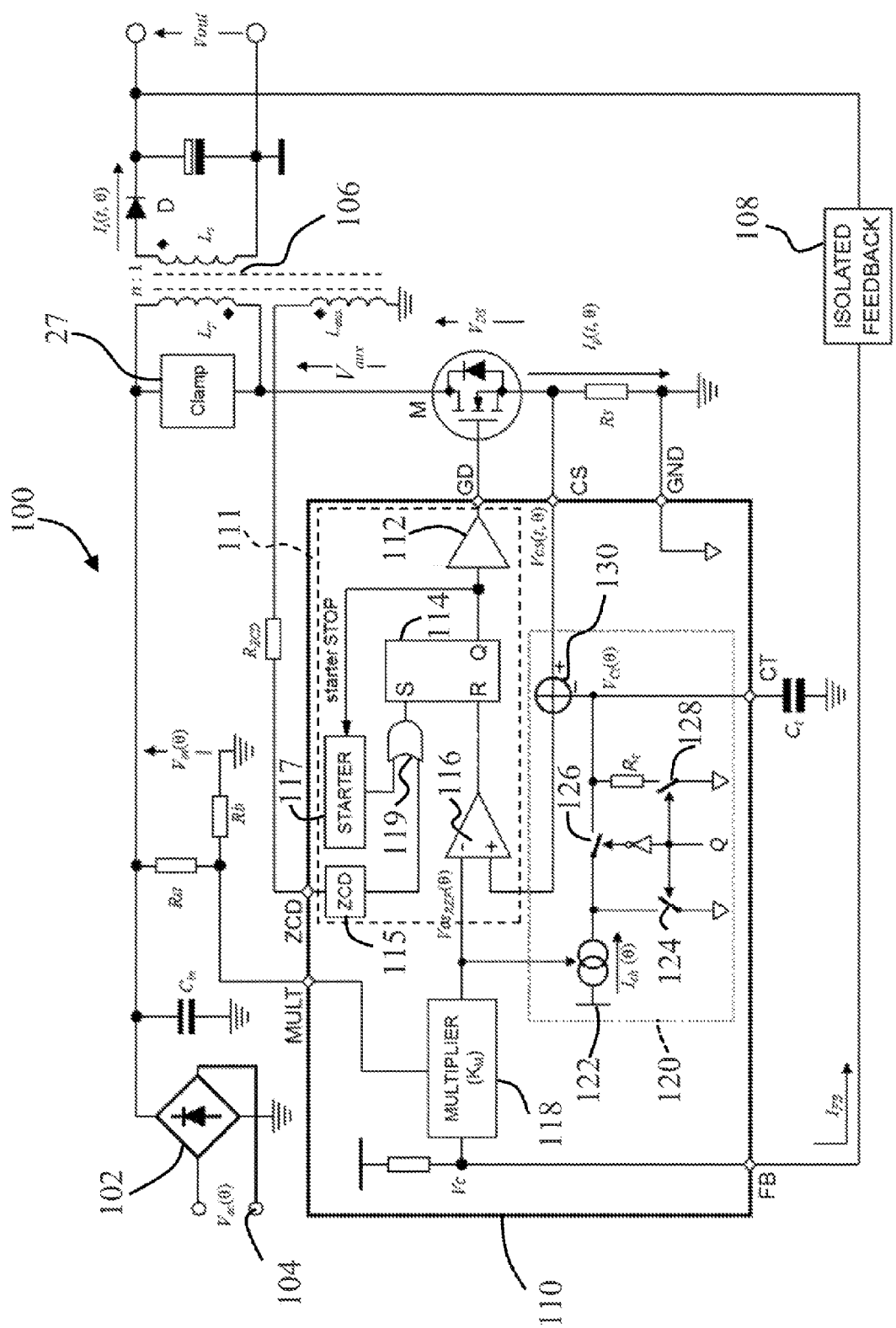
FIG. 7 shows a high power factor quasi resonant flyback converter along with the controller according to one embodiment of the present disclosure.

FIG. 7 shows a hi-PF QR flyback converter 100 showing an embodiment of the novel method that meets the control objective. The converter 100 has a primary side bridge rectifier 102, which receives an ac voltage $V_{ac}$ from an ac power line at its inputs 104, and produces a rectified voltage $V_{in}(\theta)$. The bridge rectifier 102 is coupled to a capacitor $C_{in}$ which serves as a high-frequency smoothing filter for the rectified voltage $V_{in}(\theta)$. A primary winding $L_p$ of a transformer 106 has one end coupled to the capacitor $C_{in}$ and includes an auxiliary winding $L_{aux}$. The other end of the primary winding $L_p$ is coupled to the drain of a power switch M. The power switch M has a source terminal coupled to ground through a sensing resistor Rs. The sensing resistor Rs allows a reading of the current flowing through the power switch M, and primary winding $L_p$, as a voltage drop across the resistor itself. A controller 110 controls the power switch M. As in the converter 20 of FIG. 1, the converter 100 includes the resistive voltage divider Ra–Rb connected in parallel with the capacitor $C_{in}$ and the clamp circuit 27 that clamps the spikes on the drain voltage due to the leakage inductance of the primary winding $L_p$.

On the secondary side of the converter 100, a secondary winding $L_s$ of the transformer 106 has one end connected to a secondary ground and the other end connected to the anode of a diode D. The diode D has a cathode connected to the positive plate of a capacitor $C_{out}$ that has its negative plate connected to the secondary ground. An output voltage $V_{out}$ supplies power to a load (not shown). The quantity to be regulated (either the output voltage $V_{out}$ or the output current $I_{out}$) is compared to a reference value and an error signal $I_{FB}$ is generated. This signal is transferred to the primary side by an isolated feedback block 108, typically implemented by an optocoupler (not shown). On the primary side, this error signal $I_{FB}$ is sunk from a dedicated pin FB in the controller 100, producing a control voltage $V_c$ on said pin FB. The open-loop bandwidth of the overall control loop is determined by a frequency compensation network located inside the isolated feedback block 108.

The controller 110 includes a driver circuit 111 to drive the power switch M based in part on a subtractor circuit 120. The driver circuit 111 includes a driver 112, a Set-Reset (SR) flip-flop 114, a comparator 116, a zero-crossing detector 115, a STARTER block 117, and an OR gate 119. The zero-crossing detector 115, STARTER block 117, and OR gate 119 have the same functionality as the ZCD 36, STARTER block 40, and OR gate 38 of the converter 20 of FIG. 1. Similarly to the driver 35 of FIG. 1, the driver 112 receives an output signal Q from the SR flip-flop 114. The flip-flop 114 is set by the ZCD 115 or STARTER 117, via the OR gate 119, and reset by a comparator 116, which receives at a first input a signal from the subtractor circuit 120, and at a second input a signal from a multiplier 118. The multiplier 118 receives the control voltage V at a first input, and multiplies the control voltage with a second signal representative of the rectified input voltage $V_{in}(\theta)$. Preferably, the second signal received at the multiplier 118 is a signal produced by the resistance divider Ra–Rb at the pin MULT.

Comparing the controller 110 to the controller 29 of FIG. 1, it is clear that subtractor circuit 120 is new. Unlike the comparator 32 of FIG. 1, the non-inverting input of the comparator 116 is not directly connected to the current sense pin (CS) but is instead connected to the output of the voltage subtractor circuit 120. The subtractor circuit 120 produces a subtraction signal that is a difference between the sensing signal $V_{CS}(t,\theta)$ on the current sense pin and the voltage signal $V_{C_t}(\theta)$ generated on an external capacitor $C_t$. As a result the peak envelope of the voltage fed to the non-inverting input of the comparator 116 is $V_{CS(\theta)} - Vc_t(\theta)$. The subtractor circuit 120 includes a current generator 122, which produces a current $I_{ch}(\theta)$ based on the output of the multiplier 118. The current generator 122 is coupled to a first switch 124, a second switch 126, and a third switch 128. The first switch 124 and third switch 128 are preferably closed when the output Q of the flip-flop 114 is high, i.e. when the power switch M is on. The second switch 126 is closed when the output Q of the flip-flop is low, i.e. when the power switch M is off.

A resistor $R_t$ is coupled to ground via the third switch 128, and connected in parallel to the capacitor $C_t$ when the signal Q is high, i.e. during the on-time of the power switch M, and is disconnected when Q is low, i.e. during the off-time of the power switch M. The current generator 122 is connected to the $C_t$ capacitor through the second switch 126 when the signal Q is low, i.e. during the off-time of the power switch M, and is connected to ground through the first switch 124 when Q is high, i.e. during the on-time of the power switch M. In an alternative embodiment, the terminals of the current generator 122 can be shorted together when the signal Q is high.

The voltage developed across the capacitor $C_t$ is the capacitive signal $V_{C_t}(\theta)$, and is fed to the negative input of a subtractor 130, while the signal $V_{CS}(t,\theta)$ from the pin CS is fed into the positive input of the subtractor 130. The subtractor 130 then outputs a subtraction signal having a value of $V_{CS}(t,\theta) - Vc_t(\theta)$. This subtraction signal is the output of the subtractor circuit 120, and is provided to the non-inverting input of the comparator 116.

An alternative embodiment could integrate the capacitor $C_t$ into the controller 110, thus saving one pin of the controller 110 and one external component.

The current $I_{ch}(\theta)$ provided by the current generator 122 can be expressed as:

$$I_{ch}(\theta) = g_m V_{CS,REF}(\theta), \quad (9)$$

where $g_m$ is the current-to-voltage gain of the current generator 122 and $V_{CS,REF}(\theta)$ is the current reference voltage which is the output of the multiplier circuit 118:

$$V_{CS,REF}(\theta) = K_M K_p (V_{PK} \sin \theta) V_c, \quad (10)$$

where $K_M$ is the gain of the multiplier 118.

The control voltage $V_c$ is nearly constant along a line half-cycle, resulting in the charging current $I_{ch}(\theta)$ (during power switch M off-time) having a sinusoidal shape.

An assumption for the following analysis is that $T(\theta) \ll R_t C_t \ll 1/f_L$. This allows the switching frequency ripple across $C_t$ to be negligible, and allows the current $I_{ch}(\theta)$ to be considered constant within each switching cycle.

This said, it is possible to find the voltage $Vc_t(\theta)$ developed across $C_t$ by charge balance:

$$I_{ch}(\theta)[T(\theta) - T_{ON}(\theta)] = \frac{Vc_t(\theta)}{R_t} T_{ON}(\theta). \quad (11)$$

Solving for $Vc_t(\theta)$ and considering equation (9):

$$Vc_t(\theta) = R_t I_{ch}(\theta) \frac{T(\theta) - T_{ON}(\theta)}{T_{ON}(\theta)} = g_m R_t V_{CS,REF}(\theta) \frac{T(\theta) - T_{ON}(\theta)}{T_{ON}(\theta)}. \quad (12)$$

The output of the subtractor circuit 120, which is $V_{CS(\theta)} - Vc_t(\theta)$, is fed to the non-inverting input of the comparator 116. Considering the turn-off condition imposed by the control loop, $V_{CS}(\theta) - Vc_t(\theta) = V_{CS,REF}(\theta)$, the current sense pin voltage $V_{CS}(\theta)$ results:

$$V_{CS}(\theta) = V_{CS,REF}(\theta) + Vc_t(\theta). \quad (13)$$

Solving equation (13) considering equations (10) and (12) it is possible to find the $V_{CS}(\theta)$ voltage:

$$V_{CS}(\theta) = K_M K_p (V_{PK} \sin\theta) V_c \left[ 1 + g_m R_t \frac{T(\theta) - T_{ON}(\theta)}{T_{ON}(\theta)} \right]. \quad (14)$$

Now assuming that the $g_m$ current-to-voltage gain of the current generator 122 is designed to obtain $g_m R_t = 1$, the equation (14) becomes:

$$V_{CS}(\theta) = K_M K_p (V_{PK} \sin\theta) V_c \frac{T(\theta)}{T_{ON}(\theta)}, \quad (15)$$

which has the same form as equation (8), with $Vcs_x = K_M K_p V_{PK} V_c$. So it is possible to conclude that the control circuit in FIG. 7 implements a control method that achieves a sinusoidal input current in the Hi-PF QR flyback converter 100.

Figure 8:
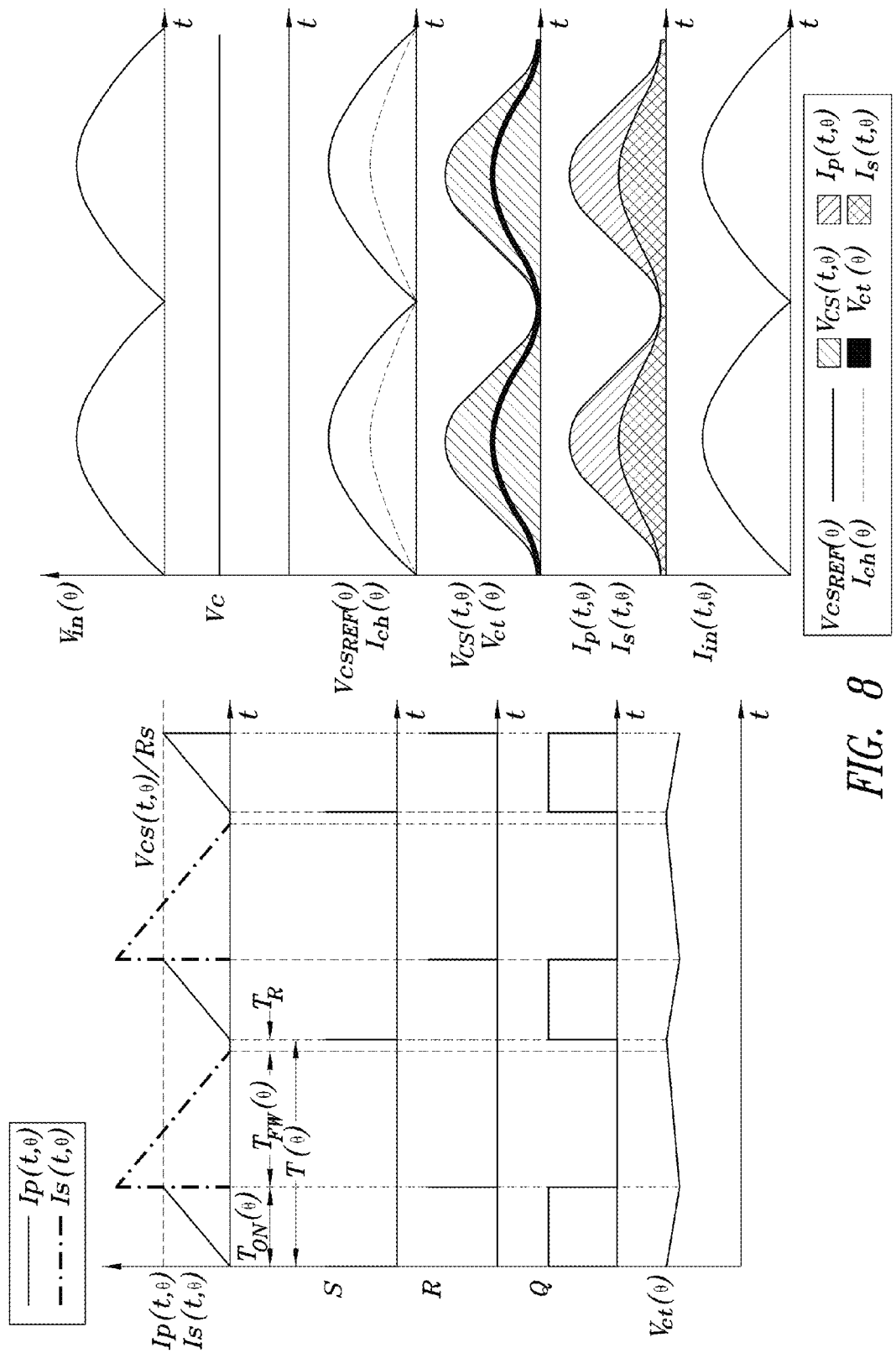
FIG. 8 shows the waveforms of the converter of FIG. 7 during normal operation; on the left-hand side the waveforms on a switching period time scale, on the right-hand side the waveforms on a line cycle time scale.

FIG. 8 illustrates the waveforms of the converter 100 of FIG. 7. On the left-hand side are the waveforms on a switching period time scale, on the right-hand side the waveforms on a line cycle time scale.

Figure 9:
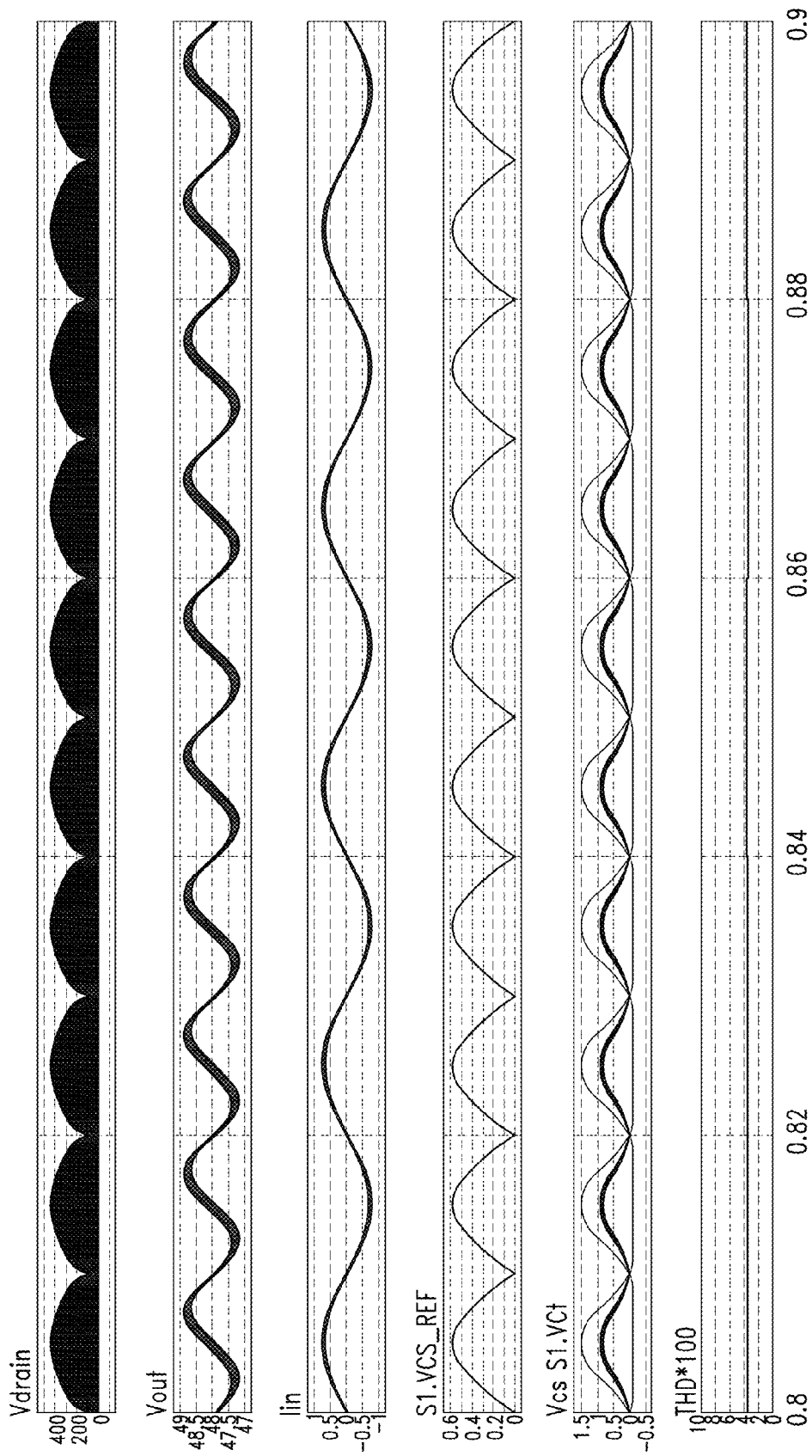
FIG. 9 shows the simulation results for the circuit in FIG. 7 @ Vin=110 Vac and full load.
Figure 10:
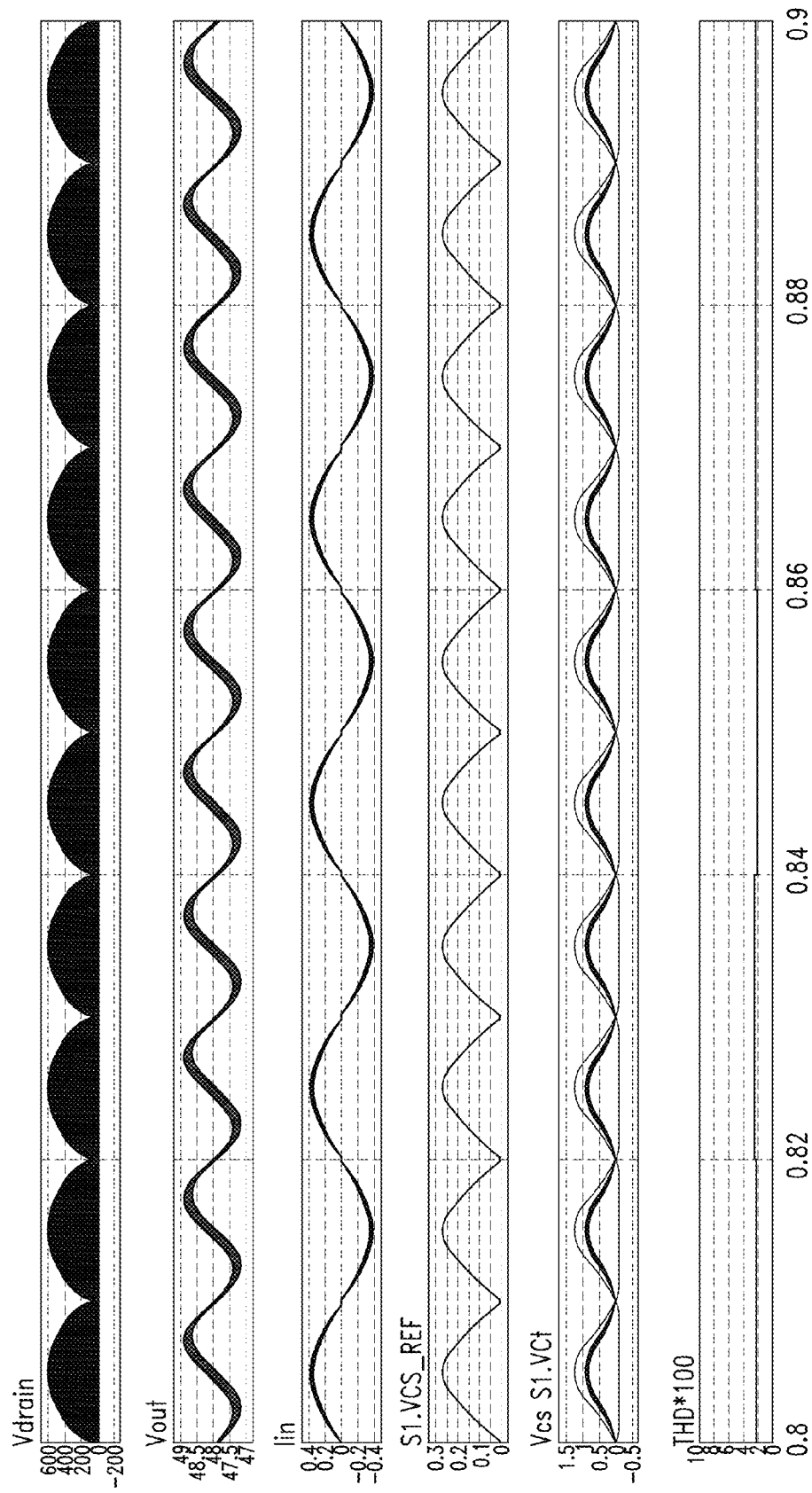
FIG. 10 shows the simulation results for the circuit in FIG. 7 @ Vin=230 Vac and full load.

FIGS. 9 and 10 show simulation results for the converter 100 of FIG. 7. It is worth noticing the very low distortion level of the input current (around 3.5% at $V_{in}$=110 Vac, around 2.2% at $V_{in}$=230 Vac), due to the input EMI filter and the nonidealities considered both in the power circuit and the control circuit.

Figure 11:
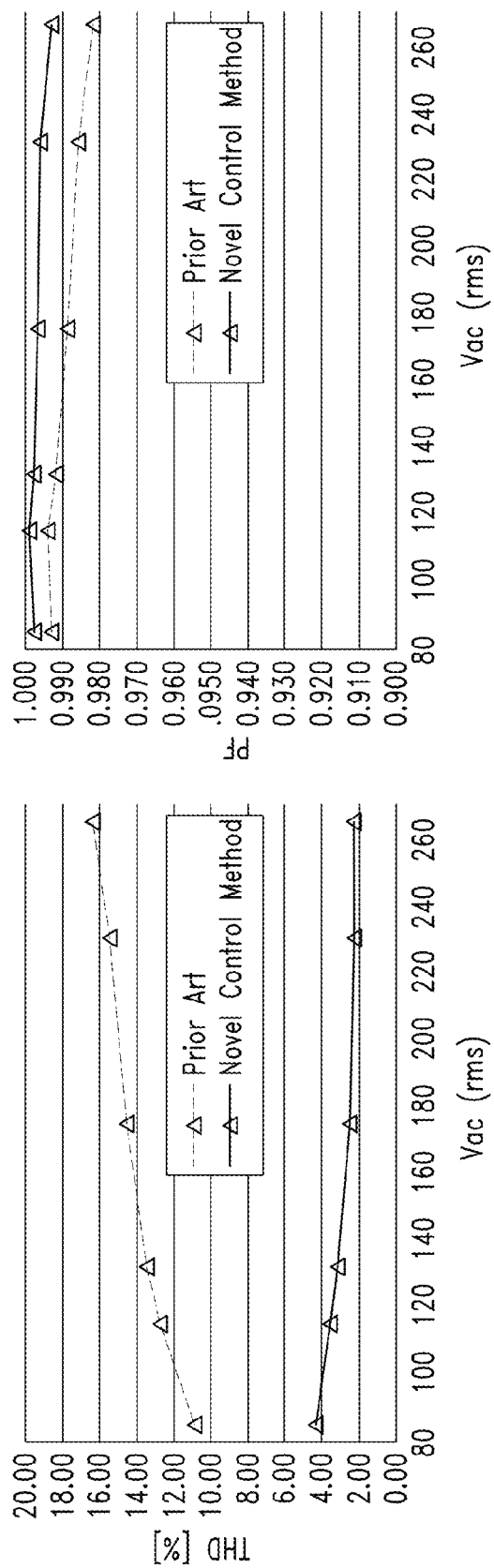
FIG. 11 shows the simulation results comparison between the prior art converter of FIG. 1 and the converter of FIG. 7 in terms of THD (left) and PF (right).

In FIG. 11 are shown the simulation results comparison between the converter 20 of FIG. 1 and the converter 100 of FIG. 7 in terms of THD (left) and PF (right). The improvement offered by the novel method over the prior art one is dramatic.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device for controlling a power transistor of a power circuit, comprising:
   a driver circuit having a first input configured to receive a voltage reference signal, a second input configured to receive a subtraction signal, and an output configured to drive the power transistor based on the voltage reference signal and subtraction signal;
   a multiplier having a first input configured to receive a first signal based on a feedback signal from the power circuit, a second input configured to receive a second signal based on an input voltage to the power circuit, and an output configured to provide the voltage reference signal based on the first and second signals; and
   a subtraction circuit configured to provide the subtraction signal based on a difference between a third signal, based on the reference voltage signal, and a sensing signal representative of a current flowing through the power transistor.

2. The device of claim 1, wherein the subtraction circuit includes:
   a current generator coupled to the multiplier and configured to produce a capacitor signal based on the voltage reference signal; and
   a subtractor configured to subtract the capacitor signal from the sensing signal and to produce the subtraction signal.

3. The device of claim 1, wherein the subtraction circuit further includes:
   a first switch configured to couple the current generator to a voltage supply terminal when the power transistor is on;
   a second switch configured to couple the current generator to the subtractor when the power transistor is off; and
   a third switch configured to couple the subtractor to the voltage supply terminal when the power transistor is on.

4. The device of claim 3, wherein the subtraction circuit further includes:
   a capacitor coupled between the subtractor and the supply voltage terminal, wherein the second switch is configured to connect the current generator to the capacitor.

5. The device of claim 4, wherein the subtraction circuit further includes:

a resistor coupled between the subtractor and the third switch, wherein the resistor is configured to discharge the capacitor when the third switch is closed.

6. The device of claim 1, wherein the driver circuit includes:
a comparator having a first input coupled to the multiplier and a second input coupled to the subtraction circuit, the comparator being configured to compare the voltage reference signal to the subtraction signal.

7. The device of claim 6, wherein the driving circuit is configured to turn off the power transistor when the subtraction signal is equal to the voltage reference signal.

8. The device of claim 6, wherein the driver circuit further includes:
a flip-flop having a reset input coupled to the output of the comparator, and an output; and a driver having an input coupled to the output of the flip-flop and an output configured to control the power transistor based on a signal from the output of the flip-flop.

9. A device for controlling a driving circuit of a power circuit, comprising:
a multiplier having a first input configured to receive a first signal based on a feedback signal from the power circuit, a second input configured to receive a second signal representative of an input voltage to the power circuit, and an output configured to provide a voltage reference signal based on the first and second signals; and
a subtraction circuit configured to provide the subtraction signal based on a difference between a third signal, based on the reference voltage signal, and a sensing signal representative of a current flowing through a power transistor of the power circuit.

10. The device of claim 9, wherein the subtraction circuit includes:
a current generator coupled to the multiplier and configured to produce a capacitor signal based on the voltage reference signal; and
a subtractor configured to subtract the capacitor signal from the sensing signal and to produce the subtraction signal.

11. The device of claim 9, wherein the subtraction circuit further includes:
a first switch configured to couple the current generator to a voltage supply terminal when the power transistor is on;
a second switch configured to couple the current generator to the subtractor when the power transistor is off; and
a third switch configured to couple the subtractor to the voltage supply terminal when the power transistor is on.

12. The device of claim 11, wherein the subtraction circuit further includes:
a capacitor coupled between the subtractor and the supply voltage terminal, wherein the second switch is configured to connect the current generator to the capacitor.

13. The device of claim 12, wherein the subtraction circuit further includes:
a resistor coupled between the subtractor and the third switch, wherein the resistor is configured to discharge the capacitor when the third switch is closed.

14. The device of claim 9, wherein the driving circuit includes:
a comparator having a first input coupled to the multiplier and a second input coupled to the subtraction circuit, the comparator being configured to compare the voltage reference signal to the subtraction signal, the driver being configured to turn off the power transistor when the subtraction signal is equal to the voltage reference signal.

15. The device of claim 14, wherein the driving circuit further includes:
a flip-flop having a reset input coupled to the output of the comparator, and an output; and
a driver having an input coupled to the output of the flip-flop and an output configured to control the power transistor based on a signal received from the output of the flip-flop.

16. A system, comprising:
a rectifier having an input and configured to output a rectified voltage;
a transformer having a primary winding configured to receive a sinusoidal input current from the rectifier;
a power transistor coupled to the primary winding of the transformer and configured to drive the transformer;
a driver circuit configured to drive the power transistor based on a voltage reference signal and a subtraction signal; and
a control circuit configured to produce the voltage reference signal and subtraction signal, the control circuit having:
a multiplier having a first input configured to receive a first signal based on a feedback signal from the power circuit, a second input configured to receive a second signal based on an input voltage to the power circuit, and an output configured to provide the voltage reference signal based on the first and second signals;
a subtraction circuit configured to provide the subtraction signal based on a difference between a third signal, based on the reference voltage signal, and a sensing signal representative of a current flowing through the power transistor.

17. The system of claim 16, wherein the driver circuit includes:
a comparator having a first input coupled to the multiplier and a second input coupled to the subtraction circuit, the comparator being configured to compare the voltage reference signal to the subtraction signal.

18. The system of claim 17, wherein the driving circuit is configured to turn off the power transistor when the subtraction signal is equal to the voltage reference signal.

19. The system of claim 17, wherein the driver circuit further includes:
a flip-flop having a reset input coupled to the output of the comparator, and an output; and
a driver having an input coupled to the output of the flip-flop and an output configured to control the power transistor based on a signal received from the output of the flip-flop.

20. The system of claim 16, wherein the subtraction circuit includes:
a current generator coupled to the multiplier and configured to produce a capacitor signal based on the voltage reference signal; and
a subtractor configured to subtract the capacitor signal from the sensing signal and to produce the subtraction signal.

21. The system of claim 20, wherein the subtraction circuit further includes:
a first switch configured to couple the current generator to a voltage supply terminal when the power transistor is on;

a second switch configured to couple the current generator to the subtractor when the power transistor is off; and a third switch configured to couple the subtractor to the voltage supply terminal when the power transistor is on.

22. The device of claim 21, wherein the subtraction circuit further includes:

a capacitor coupled between the subtractor and the supply voltage terminal, wherein the second switch is configured to connect the current generator to the capacitor.

23. The device of claim 22, wherein the subtraction circuit further includes:

a resistor coupled between the subtractor and the third switch, wherein the resistor is configured to discharge the capacitor when the third switch is closed.

24. A method for controlling a power transistor of a power circuit, comprising:

providing a voltage reference signal by multiplying a first signal, based on a feedback signal from the power circuit, and a second signal, based on an input voltage to the power circuit;

providing a subtraction signal based on a difference between a third signal, based on the reference voltage signal, and a sensing signal representative of a current flowing through the power switch; and driving the power transistor based on the voltage reference signal and the subtraction signal.

25. The method of claim 24, wherein providing the subtraction signal includes:

charging a capacitor with a current generator and discharging the capacitor with a resistor, the third signal being a voltage on the capacitor; and subtracting the third signal from the sensing signal to produce the subtraction signal.

* * * * *